Aug. 3, 1937.   A. J. FERKEL   2,088,591
MIXING DEVICE
Filed Dec. 27, 1935
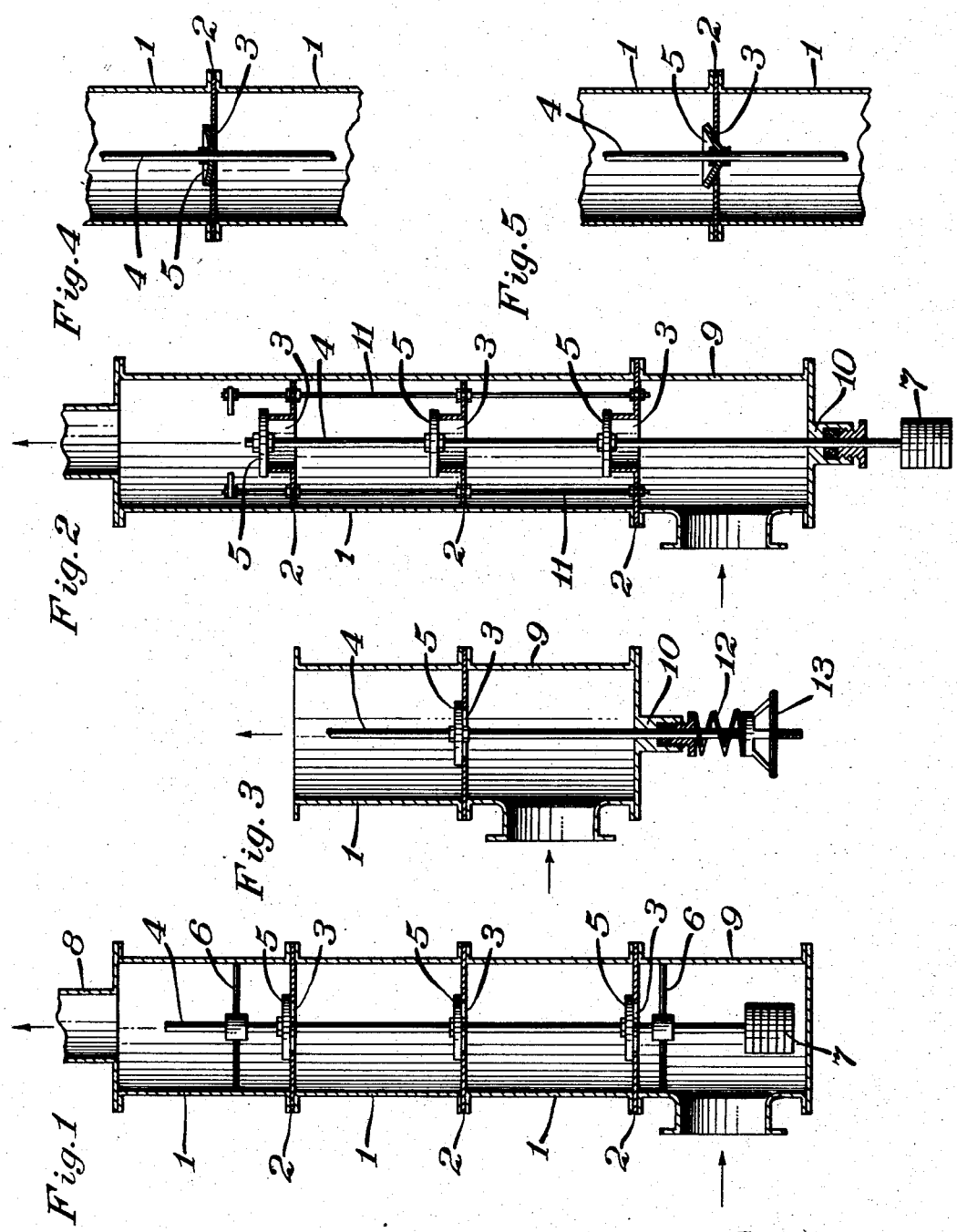
Inventor
Albert J. Ferkel
By *T. Wallace Quinn*
his Attorney Patented Aug. 3, 1937

2,088,591

UNITED STATES PATENT OFFICE 2,088,591

MIXING DEVICE

Albert J. Ferkel, Brunswick, Ga., assignor to The Atlantic Refining Company, Philadelphia, Pa., a corporation of Pennsylvania Application December 27, 1935, Serial No. 56,337

7 Claims. (Cl. 259—4)

The present invention relates to a method and device for contacting fluid substances, and relates more particularly to the contacting or mixing of liquids with liquids or solids, liquids with gases or vapors, or gases with gases.

A principal object of the invention is the contacting or mixing of fluid substances with one another in such a manner that the pressure drop through the contacting or mixing device is maintained substantially constant at any rate of fluid flow within the capacity of the device.

A further object of this invention is the contacting or mixing of fluid substances with one another in such a manner that the degree of intimacy of contacting or mixing is maintained substantially uniform, within limits, regardless of the rate of fluid flow through the contacting device.

The conventional fixed-orifice or jet type mixing devices heretofore employed for contacting or mixing fluid substances have the disadvantage that the pressure drop and the degree of intimacy of mixing vary to a great extent with the rate of through-put of the device. Since the pressure drop through a contacting device such as a fixed-orifice or "knot-hole" mixer is proportional to the square of the velocity of fluid flow therethrough, it will be seen, for example, that doubling of the through-put or velocity of flow will cause a fourfold increase in the pressure drop through the device. Furthermore, the degree of mixing or contacting is, in general, proportional to the energy input to the mixing or contacting operation, or in other words, the degree of mixing is proportional within limits, to the pressure drop. Usually the greater the pressure drop, the greater will be the degree of intimacy of mixing or contacting. In many instances, too great a pressure drop will cause an excessive degree of mixing, with the resultant formation of undesirable emulsions. This increase in pressure drop with increase in through-put is undesirable, since, for the desired degree of mixing, the energy requirements may be unduly excessive by reason of the increased pressure drop.

In accordance with my invention, I overcome the above mentioned difficulties by providing a mixing or contacting device in which the effective size of the orifice is varied automatically with changes in the rate of fluid flow through the device, thus permitting the maintenance of a substantially constant pressure drop and degree of mixing for any rate of fluid flow within the capacity of the mixing device.

My device and the various modifications thereof is further illustrated, in cross-section, in the accompanying drawing. Corresponding elements in the different figures are similarly numbered.

Figures 1, 2 and 3 are longitudinal sectional views of my mixing device, illustrating various modifications of loading means and diaphragms which may be employed.

Figures 4 and 5 are longitudinal sectional views, illustrating particularly modified constructions of the baffle members which co-act with the diaphragms.

Referring to Figure 1, the contacting vessel comprises a plurality of flanged sections 1, between which are interposed the diaphragms or plates 2, each of which is provided with an orifice or opening 3. A shaft or rod 4, is disposed within the vessel 1, preferably axially thereof, and is provided with baffles or closure members 5, which are preferably of such size as to overlap the openings 3. The shaft 5 is further provided with guides 6 which function to maintain the shaft centrally of the vessel and insure the proper seating of the baffles 5 on the diaphragm members 2. At the lower end of the shaft is attached a counter-balance such as a weight 7, which may be adjusted to give the desired resistance against the upward flow of fluid against the baffles 5. The upper section of the contacting vessel is provided with a means for withdrawing fluid, such as the flanged outlet 8, and the lower section of the vessel is attached to T-section 9 which functions both as a fluid inlet and as a means of access to the shaft and weight 7.

In operation, the fluids to be contacted or admixed are supplied, under pressure, to the T-section 9 at the base of the vessel, and flow upwardly through the diaphragm orifices or openings 3 against the baffles 5. The pressure of the incoming fluids causes the baffles, shaft and counter-balance to lift in proportion to the velocity of the fluid passing through the orifices and permits of turbulent flow sufficient to effect the desired degree of contacting or mixing. The rise or fall of the baffles with increase or decrease of flow causes the effective size of the orifices 3 to vary in such a manner that a substantially constant pressure drop is obtained throughout the vessel, at any rate of flow within the capacity of the device. At the same time the degree of mixing or contacting is likewise maintained substantially constant at different rates of through-put, since the degree of mixing is, in general, proportional to the pressure drop. The weight of the shaft, baffles and counter-balance is adjusted so that at the maximum rate of fluid flow or through-put, the baffle members 5 are positioned with respect to the orifices 3 in such manner that the annular area between the baffles, when raised, and the orifices does not exceed the cross-sectional area of the orifices. The shaft guides 6 may, when properly situated, function as stops to prevent the shaft and baffles 5 from rising to such an extent as to fail to vary the effective size of the diaphragm orifices 3. It will be understood that the dimensions of the vessel, baffles and orifices, as well as the weight of the counter-balance, must be suitably chosen in order to prevent over-loading of the device, especially at high rates of through-put. Should the rate of flow through the device be sufficient to raise the baffle members a distance much in excess of ¼ the diameter of the orifices, the effective size of the orifices cannot be further increased and will thereafter function as fixed or invariable orifices in which the pressure drop will increase as the velocity of flow increases.

Fig. 2 of the drawing illustrates a modification of my mixing device in which the vessel comprises a single body section 1 provided at one end with a flanged outlet 8, and at the other end with a T-section 9 and a flange plate carrying a packing gland 10. Between the T-section 9 and the body section 1 is disposed the lowermost diaphragm 2, provided with a short open-ended tube extending from the diaphragm in the direction of fluid flow. The succeeding diaphragms, provided with similarly constructed off-set orifices 3, are spaced from the lowermost diaphragm and from each other by means of spacing rods 11, which may be either welded or bolted to the aforesaid diaphragms 2. This construction makes possible the insertion into the body section 1 of all of the diaphragms as a single unit, with the resultant ease and economy of withdrawal and replacement. The shaft 4 and baffle or closure members 5 are similar to those shown in Fig. 1, while the end of the shaft is journalled in the packing gland 10, and the counter-balance weight 7 is disposed externally of the T-section 9.

Fig. 3 represents a portion of the mixing or contacting vessel in which an adjustable tension spring is employed as a counterbalance in place of the weight 7 shown in Figures 1 and 2. The end of shaft 4 passes through the packing gland 10 and is provided with a spring 12, the tension of which may be varied by means of an adjusting wheel 13. The downward pull on the shaft 4 against the upward flow of fluids past the baffle members 5 may be adjusted by increasing or decreasing the tension upon the spring. This construction is particularly adapted where the mixing or contacting vessel is positioned other than vertically, for example, at an angle or even horizontally.

Figures 4 and 5 illustrate various modifications in the shape of the baffle members 5 which may be employed in my contacting device. In Fig. 4 the baffle is circular with a convex lower surface, while in Fig. 5 the baffle is of a generally conical shape.

In any of the above structures, the diaphragms 2 may be provided with more than one orifice with its co-acting baffle or closure member. Furthermore, the shape of the orifice need not be circular, but may, for example, be of an oval or rectangular, or other desired shape.

My device may be employed in practically every instance where the contacting or mixing of fluid substances is desired, and is particularly adapted in the contacting of partially miscible or immiscible liquids.

For example, petroleum naphtha was contacted with a solution of sodium plumbite in a device of the type hereinbefore described, such device being a vessel 8" in diameter and having 6 diaphragm plates vertically spaced from one another at 24" intervals. The diaphragm plates were each provided with a circular orifice or opening 4" in diameter and were fitted with baffle or closure members of 5½" diameter mounted upon a common shaft, the total weight of the shaft, baffles and counterbalance being of the order of 60 lbs. At through-put rates of from about 20 bbl. to about 400 bbl. per hour, the pressure drop through the contacting device was approximately 5 lbs./sq. in., the maximum deviation in pressure drop being of the order of 1 lb./sq. in., for all rates of flow within the mentioned range. It will be seen that for a throughput within the range of 20 to 400 bbl. per hour, the pressure drop and degree of mixing were substantially constant, whereas in the employment of the conventional type of mixer having a fixed orifice, the pressure drop, on increasing the through-put from 20 to 400 bbl. per hour, would rise from 5 lbs./sq. in. to about 2000 lbs./sq. in., which latter pressure drop would be utterly impractical.

Herein and in the appended claims, the term "fluid substances" is to be understood to comprehend liquids, gases or vapors, and solids, which of themselves, or in admixture with liquids, are capable of flowing.

What I claim is:

1. A contacting device for fluid substances which comprises a vessel, a rod disposed therein and provided with baffle members spaced one from another, stationary diaphragm members arranged between and co-acting with the aforesaid baffle members, said diaphragm members having openings to permit fluid flow therethrough and to accommodate said rod, means for introducing fluid substances into said vessel and for withdrawing same therefrom, and means for maintaining said rod and baffle members yieldingly counter-balanced against the flow of substances through said diaphragm members.

2. A contacting device for fluid substances which comprises a vessel, a rod disposed axially therein and provided with baffle members spaced one from another, stationary diaphragm members arranged between and co-acting with the aforesaid baffle members, said diaphragm members having axial openings to permit fluid flow therethrough and to accommodate said rod, means for introducing fluid substances into said vessel and for withdrawing same therefrom, and means for maintaining said rod and baffle members yieldingly counter-balanced against the flow of substances through said diaphragm members.

3. A contacting device for fluid substances which comprises a vessel, a rod disposed axially therein and provided with baffle members spaced one from another, guiding means for maintaining said rod axially within said vessel, stationary diaphragm members arranged between and co-acting with the aforesaid baffle members, said diaphragm members having axial openings to permit fluid flow therethrough and to accommodate said rod, means for introducing fluid substances into said vessel and for withdrawing same therefrom, and means for maintaining said rod and baffle members yieldingly counter-balanced against the flow of substances through said diaphragm members.

4. A contacting device for fluid substances which comprises an elongated vessel, a longitudinally movable rod disposed axially therein and provided with baffle members spaced one from another, said baffle members being of smaller cross-sectional area than said elongated vessel, stationary diaphragm members arranged between and co-acting with the aforesaid baffle members, said diaphragm members being of substantially the same cross-sectional area as said elongated vessel and having axial openings to permit fluid flow therethrough and to accommodate said rod, means for introducing fluid substances into said vessel and for withdrawing same therefrom, and means for yieldingly counter-balancing said rod and baffle members against the flow of substances through said diaphragm members.

5. A contacting device for fluid substances which comprises an elongated vessel, a longitudinally movable rod disposed axially therein and provided with baffle members spaced one from another, said baffle members being of smaller cross-sectional area than said elongated vessel, guiding means for maintaining said rod axially within said vessel, stationary diaphragm members arranged between and co-acting with the aforesaid baffle members, said diaphragm members being of substantially the same cross-sectional area as said elongated vessel and having axial openings to permit fluid flow therethrough and to accommodate said rod, means for introducing fluid substances into said vessel and for withdrawing same therefrom, and means for yieldingly counter-balancing said rod and baffle members against the flow of substances through said diaphragm members.

6. A contacting device for fluid substances which comprises a vertical, cylindrical vessel, a vertically movable rod disposed axially therein and provided with a plurality of circular horizontal baffles vertically spaced one from another, said circular baffles being of smaller cross-sectional area than said cylindrical vessel, a plurality of stationary, horizontal diaphragms alternately arranged between the aforesaid baffles, said diaphragms being of substantially the same cross-sectional area as said cylindrical vessel and each having an axial opening to permit fluid flow therethrough and to accommodate said rod, means for introducing fluid substances into said cylindrical vessel beneath the lowermost diaphragm and means for withdrawing fluid substances from said cylindrical vessel above the uppermost baffle, and means for yieldingly counter-balancing said rod and baffles against the flow of substances through said diaphragm openings.

7. A contacting device for fluid substances which comprises a vertical, cylindrical vessel, a vertically movable rod disposed axially therein and provided with a plurality of circular, horizontal baffles vertically spaced one from another, said circular baffles being of smaller cross-sectional area than said cylindrical vessel, guides for maintaining said rod axially within said cylindrical vessel, a plurality of stationary, horizontal diaphragms alternately arranged between the aforesaid baffles, said diaphragms being of substantially the same cross-sectional area as said cylindrical vessel and each having an axial opening to permit fluid flow therethrough and to accommodate said rod, means for introducing fluid substances into said cylindrical vessel beneath the lowermost diaphragm and means for withdrawing fluid substances from said cylindrical vessel above the uppermost baffle, and means for yieldingly counter-balancing said rod and baffles against the flow of substances through said diaphragm openings.

ALBERT J. FERKEL.